Nov. 11, 1958 V. ASARO 2,859,802
SPRING CUSHION STRUCTURE
Filed Nov. 10, 1955 2 Sheets-Sheet 1

INVENTOR.
Vito Asaro
BY
Attorney.

Nov. 11, 1958  V. ASARO  2,859,802
SPRING CUSHION STRUCTURE
Filed Nov. 10, 1955  2 Sheets—Sheet 2

INVENTOR.
Vito Asaro
BY
Otto A. Earl
Attorney

United States Patent Office 2,859,802
Patented Nov. 11, 1958

2,859,802

SPRING CUSHION STRUCTURE

Vito Asaro, Detroit, Mich., assignor to L. A. Young Spring & Wire Corporation, Detroit, Mich.

Application November 10, 1955, Serial No. 546,241

4 Claims. (Cl. 155—179)

This invention relates to spring cushion structures readily adapted for various types of spring cushion seat and back structures.

The main objects of this invention are:

First, to provide a spring cushion including sinuously bent or zigzag type of spring elements in which the elements are very effectively supported to sustain loads imparted thereto at various angles and at the same time one which permits rapid and selective assembly of the spring elements to meet particular requirements.

Second, to provide a structure having these advantages which is very economical in its parts and at the same time provides a very strong and secure means for supporting the spring elements.

Third, to provide a support means for sinuously bent or zigzag spring elements which permits the effective engagement of the elements with the support means without the aid of tools.

Objects relating to details and economies of the invention will appear from the description to follow. The invention is defined and pointed out in the claims.

A preferred embodiment of the invention is illustrated in the accompanying drawing, in which.

Figure 1:
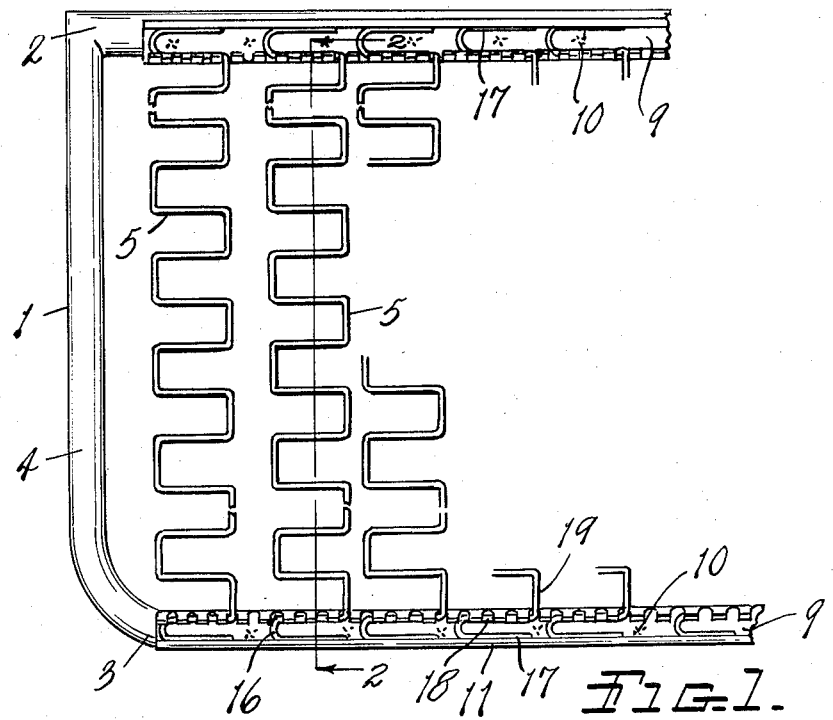
Fig. 1 is a fragmentary plan view of parts of a seat cushion unit embodying my invention.
Figure 2:
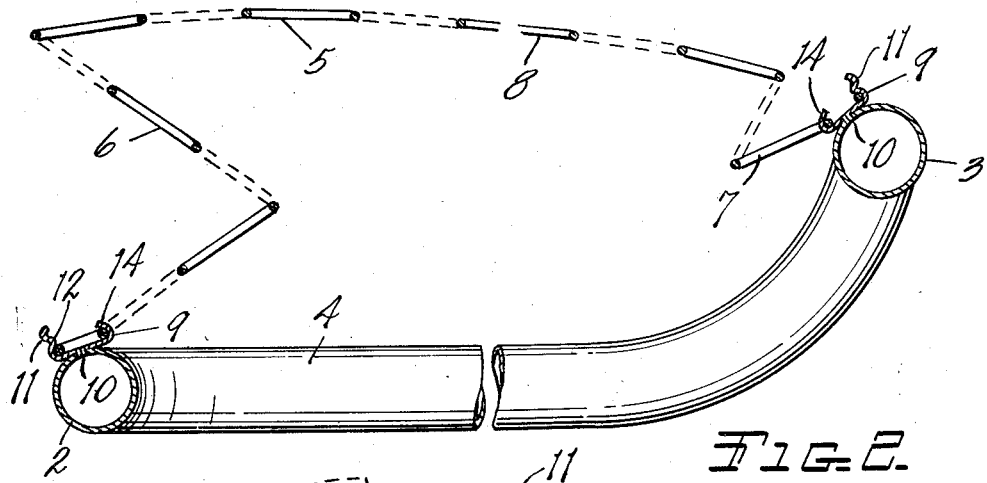
Fig. 2 is an enlarged fragmentary view sectioned on a line corresponding to line 2—2 of Fig. 1.

In the accompanying drawing 1 represents a seat cushion base frame which in the embodiment illustrated is formed of tubular stock and comprises a front member 2, rear member 3 and end members 4. In this embodiment the rear member 3 is disposed in a plane substantially above the front member, the particular structure illustrated being designed to provide foot room at the rear of the seat.

The spring elements 5 are of the sinuously bent or zigzag type and are provided with angled arms 6 at their front ends and angled arms 7 at their rear ends, these arms supporting the seat or load portion 8.

The spring element attaching bars 9 are formed of elongated metal strips desirably of the full length of the front and rear base frame members 5. These attaching bars are fixedly rigidly secured to the base frame members desirably by spot welding indicated at 10. The bars 9 have upwardly projecting flanges 11 on their outer edges. These flanges have longitudinal corrugation like insets 12 preferably curved and coacting with the faces of the bars to provide a continuous inwardly facing channel like seat 13. The bars 9 have a plurality of upwardly projecting longitudinally spaced hook like inner seat members 14 facing the seats 13.

Figure 3:
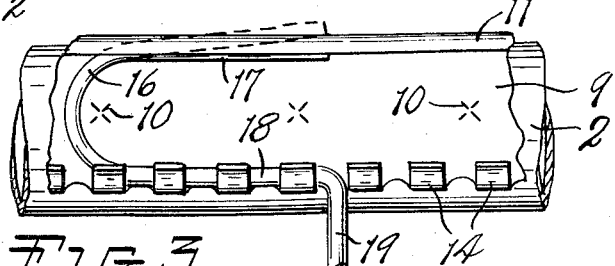
Fig. 3 is a fragmentary plan view illustrating one of the spring elements connected to its support, the spring tension engagement of the terminal loop of the element with the supporting bar being indicated by full and dotted lines.
Figure 4:
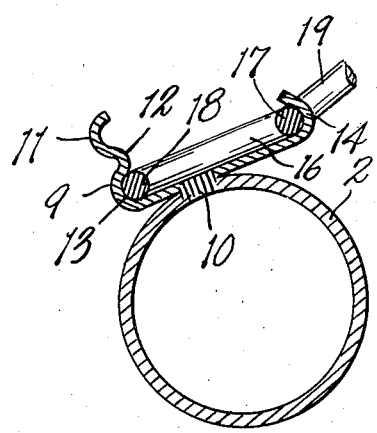
Fig. 4 is an enlarged fragmentary view sectioned on a line corresponding to line 2—2 of Fig. 1.
Figure 5:
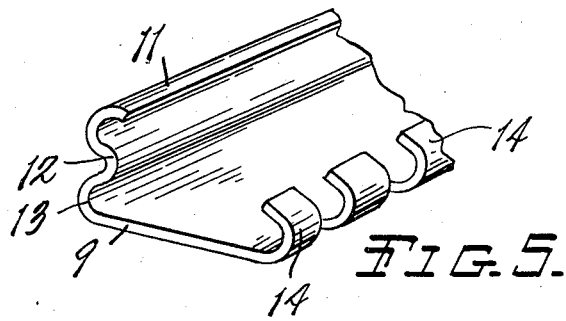
Fig. 5 is a fragmentary perspective view of one of the spring supporting bars as illustrated in Figs. 1 to 5 inclusive.

The spring elements are provided with terminal loops 16 which are disposed flat wise upon the bars 9 with the outer arms 17 of the loop engaged within the inwardly facing outer seats 13 and their inner arms 18 engaged with the inwardly facing seat members 14. The loops are engaged under spring compression, this compression being indicated by dotted and full lines in Figs. 3 and 7.

The reaches 19 adjacent the loops are disposed between adjacent pairs of seat members 14 as is clearly illustrated in the drawing which prevents any lateral shifting of the spring elements. The spring elements may be easily mounted in selected positions without the aid of tools.

It will be noted in Fig. 1 that the spring elements are differently spaced. This mounting means for the spring elements thus being spaced as desired. The terminal loops are disposed flat wise on the supporting bars and being engaged with the seats under spring tension withstand the varying stresses to which they may be subjected to in use.

In the embodiment shown in Figs. 1 to 5 inclusive the seat members 14 are tongue like and uniformly spaced, the spacing being such that reaches 19 of the spring elements are engaged between adjacent pairs of seat members so that elements cannot shift longitudinally or in fact in any manner on the bars.

Figure 6:
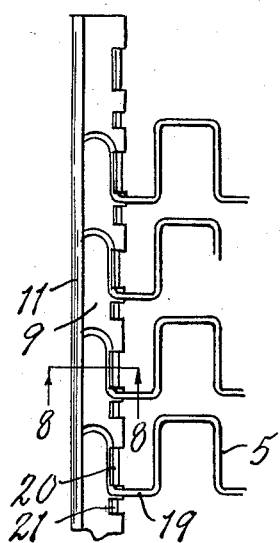
Fig. 6 is a fragmentary plan view of a slightly modified form or embodiment of my invention.
Figure 7:
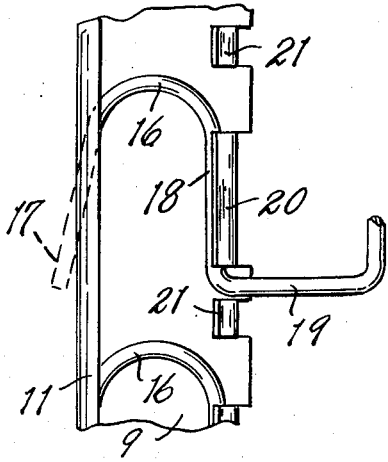
Fig. 7 is an enlarged fragmentary plan view of the embodiment shown in Fig. 6, the spring tension engagement of the loop with the supporting bar being indicated by full and dotted lines.
Figures 8, 10:
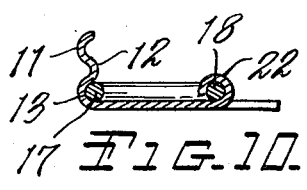
Fig. 8 is a fragmentary sectional view on a line corresponding to line 8—8 of Fig. 6.
Fig. 10 is a fragmentary sectional view on a line corresponding to line 10—10 of Fig. 9.

In the modification shown in Figs. 6, 7 and 8 the inner seat elements 20 are uniformly spaced but spaced substantially more than in the embodiment shown in Figs. 1 to 5 inclusive and an upwardly projecting stop lug 21 is provided for each seat member 20 being spaced therefrom to receive the reach 19 and thereby prevent shifting of the spring elements longitudinally of the bars.

Figure 9:
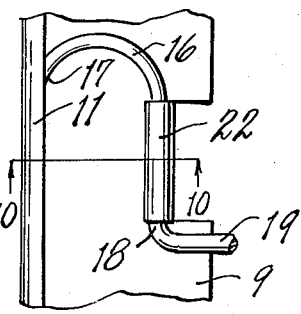
Fig. 9 is a fragmentary plan view of another modification or embodiment of my invention

In the embodiment shown in Figs. 9 and 10 the inner seat elements 22 are of such length that they may be folded or clamped around the inner arms of the loops as is illustrated. The members 22 are of substantial length and embrace substantial portions of the inner arms of the loops so that longitudinal shifting is prevented. However, it is desired to point out that the structures of Figs. 1 to 7 inclusive are entirely effective in holding the terminal loops of the spring elements and they are presently regarded as the preferable structure as they do not require the use of tools to mount the spring element.

I have not attempted to illustrate or describe other adaptations or embodiments which I contemplate as it is believed this disclosure will enable those skilled in the art to embody or adapt my invention as may be desired.

Having thus described the invention, what is claimed as new and is desired to be secured by Letters Patent is:

1. In a spring structure, an elongated supporting bar having an upwardly projecting flange at its outer edge, the flange having an inwardly facing longitudinally extending channel like outer seat, said bar having a series of longitudinally spaced upwardly projecting hook-like inner seat members spaced from and facing said outer seat, and a plurality of laterally spaced sinuously bent spring elements terminating in U-shaped springable loops disposed flat wise upon said bar with the outer arms of the loops engaged in said outer seat and the inner arms thereof engaged with opposed inner seat member with the loops under compressed spring tension, the reaches of the spring elements from which the inner arms of the loops extend being disposed between adjacent pairs of inner seat members thereby preventing longitudinal shifting of the loops upon said supporting bar.

2. A spring structure comprising an elongated supporting bar having an upwardly projecting flange at its outer edge, the flange having a longitudinally extending inwardly facing channel-like outer seat, said bar having a series of longitudinally spaced upwardly projecting inner seat members spaced from and facing said outer seat, and a plurality of laterally spaced sinuously bent spring elements terminating in springable loops disposed flat wise upon said bar with the outer arms of the loops engaged in said outer seat and the inner arms thereof engaged with inner seat members and with the loops under compressed spring tension and normally retaining them in supported relation upon the bar, the reaches of the spring elements from which the inner arms of the loops extend being disposed between adjacent pairs of inner seat members thereby preventing longitudinal shifting of the loops upon the attaching bar.

3. A spring structure comprising an elongated supporting bar having an upwardly projecting flange at its outer edge cross sectionally conformed to provide a continuous longitudinally extending inwardly facing channel-like outer seat, the inner edge of said bar being slit and conformed to provide a series of uniformly spaced upwardly projecting hook-like inner seat members on its inner edge spaced from and facing the outer seat, and a plurality of sinuously bent spring elements terminating in U-shaped springable loops disposed flatwise upon said bar with the terminal outer arms of the loops engaged in said outer seat and the inner arms thereof engaged with inner seat members with the loops under spring tension and with the reaches of the spring elements from which the inner arms of the loop extend disposed between adjacent pairs of inner seat members thereby preventing longitudinal shifting of the loops upon said supporting bar.

4. A spring structure comprising an elongated supporting bar having an upwardly projecting flange at its outer edge cross sectionally conformed to provide a continuous longitudinally extending inwardly facing channel-like outer seat, the inner edge of said bar being transversely slit and conformed to provide a series of longitudinally spaced upwardly projecting hook-like inner seat members on its inner edge spaced from and facing the outer seat, and a plurality of sinuously bent spring elements terminating in U-shaped springable loops disposed flatwise upon said bar with the terminal outer arms of the loops engaged in said outer seat and the inner arms thereof engaged with inner seat members with the loops under spring tension.

References Cited in the file of this patent
UNITED STATES PATENTS

| 2,249,031 | Neely | July 15, 1941 |
| 2,695,658 | Flint | Nov. 30, 1954 |